United States Patent
Ozone

(10) Patent No.: US 8,520,117 B2
(45) Date of Patent: *Aug. 27, 2013

(54) IMAGE DISPLAY APPARATUS AND PHOTOGRAPHING APPARATUS THAT SETS A DISPLAY FORMAT ACCORDING TO A SENSED MOTION

(75) Inventor: Takayoshi Ozone, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/269,792

(22) Filed: Oct. 10, 2011

(65) Prior Publication Data

US 2012/0026350 A1  Feb. 2, 2012

Related U.S. Application Data

(63) Continuation of application No. 11/522,790, filed on Sep. 18, 2006, now Pat. No. 8,035,720.

(30) Foreign Application Priority Data

Dec. 28, 2005  (JP) ................................. 2005-377347

(51) Int. Cl.
*H04N 5/222* (2006.01)
(52) U.S. Cl.
USPC .................................. 348/333.02; 348/333.12
(58) Field of Classification Search
None
See application file for complete search history.

(56) References Cited

U.S. PATENT DOCUMENTS

| | | | |
|---|---|---|---|
| 4,471,382 A | 9/1984 | Toyoda et al. | |
| 2002/0109782 A1 | 8/2002 | Ejima et al. | |
| 2002/0143489 A1* | 10/2002 | Orchard | 702/141 |
| 2003/0038779 A1 | 2/2003 | Baron et al. | |
| 2003/0190136 A1 | 10/2003 | Yamamoto | |
| 2003/0222889 A1* | 12/2003 | Parulski et al. | 345/619 |
| 2004/0070675 A1 | 4/2004 | Fredlund et al. | |
| 2004/0257458 A1* | 12/2004 | Huang et al. | 348/333.01 |
| 2005/0083351 A1* | 4/2005 | Kawamoto et al. | 345/660 |
| 2005/0114788 A1* | 5/2005 | Fabritius | 715/767 |

(Continued)

FOREIGN PATENT DOCUMENTS

| | | |
|---|---|---|
| JP | 06-004208 A | 1/1994 |
| JP | 2000-125184 A | 4/2000 |

(Continued)

OTHER PUBLICATIONS

Office Action established for JP2005-377347 (Jul. 20, 2010).
Official Inquiry issued for JP 2005-377347 (Aug. 14, 2012).
Appeal Decision issued for JP 2005-377347 (Feb. 12, 2013).

* cited by examiner

Primary Examiner — Nelson D. Hernández
Assistant Examiner — Dennis Hogue
(74) Attorney, Agent, or Firm — Drinker Biddle & Reath LLP

(57) ABSTRACT

Provided is an image display apparatus whose display images can be viewed regardless of an orientation or an aspect ratio of a display image. When a user sets the orientation and the aspect ratio of a live view display, a background frame corresponding to the orientation and the aspect ratio set by the user is selected. Then, a spare region is determined, and icons are placed in the determined spare region. When the orientation or aspect ratio of the display image is changed, the position of the icons is also changed so that the appearance of the display images is not overlapped with icons or information.

17 Claims, 6 Drawing Sheets

(56) References Cited

U.S. PATENT DOCUMENTS

| | | |
|---|---|---|
| 2005/0146631 A1 | 7/2005 | Shelton et al. |
| 2005/0216867 A1* | 9/2005 | Marvit et al. ............. 715/863 |
| 2006/0103734 A1 | 5/2006 | Kim et al. |
| 2006/0125926 A1* | 6/2006 | Nishino ............. 348/208.13 |
| 2006/0132638 A1* | 6/2006 | Saitou ............. 348/333.01 |
| 2006/0164382 A1 | 7/2006 | Kulas et al. |
| 2006/0204232 A1 | 9/2006 | Weinberg et al. |
| 2007/0052832 A1 | 3/2007 | Bae et al. |
| 2007/0057917 A1 | 3/2007 | Bae |

FOREIGN PATENT DOCUMENTS

| | | |
|---|---|---|
| JP | 2000-184263 A | 6/2000 |
| JP | 2001-211367 A | 8/2001 |
| JP | 2002-064738 A | 2/2002 |
| JP | 2003-134378 A | 5/2003 |
| JP | 2003-202620 A | 7/2003 |
| JP | 2004-032359 A | 1/2004 |
| JP | 2004-072754 A | 3/2004 |
| JP | 2005-057540 A | 3/2005 |

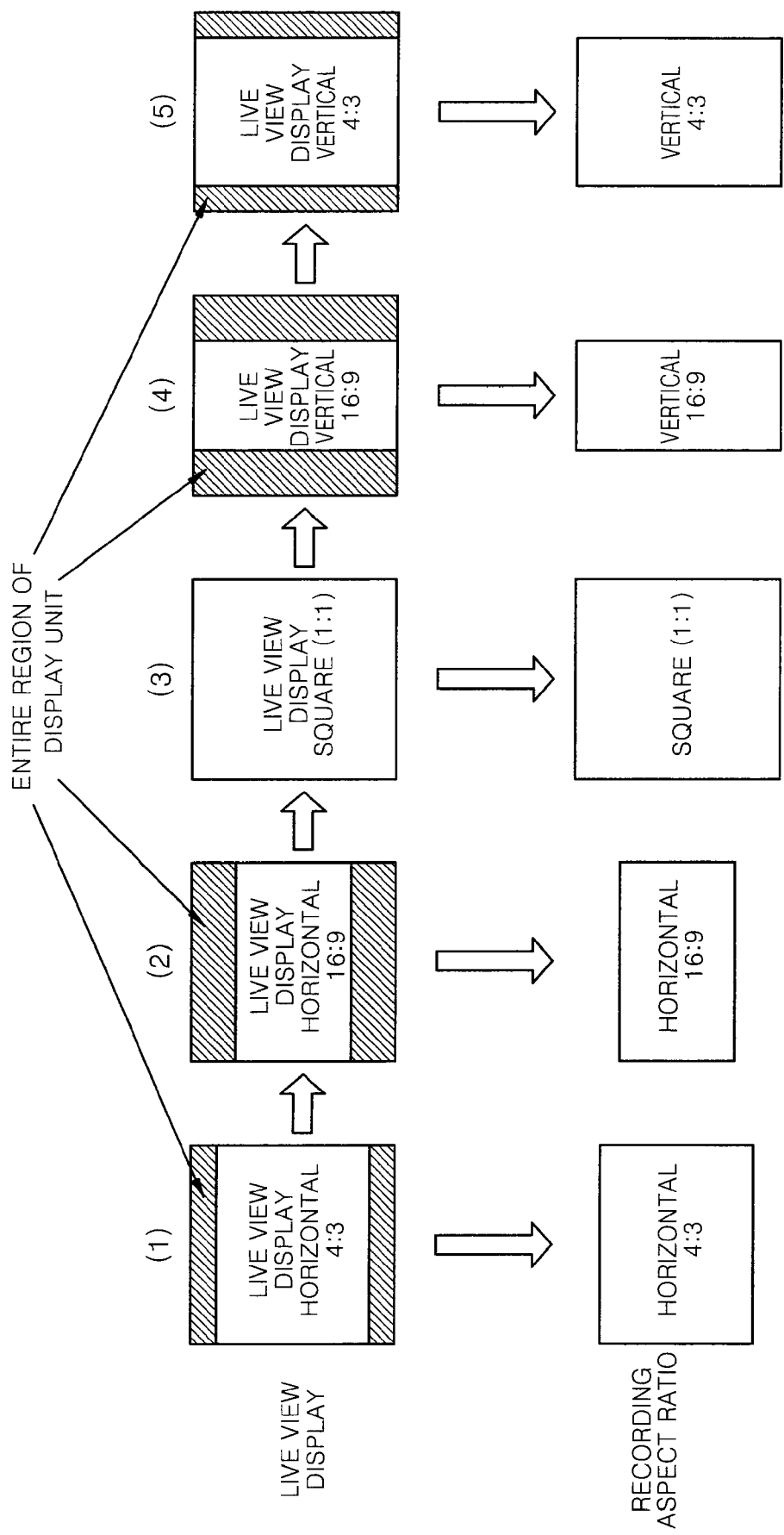

IMAGE DISPLAY APPARATUS AND PHOTOGRAPHING APPARATUS THAT SETS A DISPLAY FORMAT ACCORDING TO A SENSED MOTION

CROSS-REFERENCE TO RELATED PATENT APPLICATIONS

This application is a continuation of U.S. patent application Ser. No. 11/522,790 entitled "Image Display Apparatus and Photographing Apparatus" and filed on Sep. 18, 2006, which claims the priority benefit of Japanese Patent Application No. 2005-377347, filed on Dec. 28, 2005, in the Japanese Patent Office, the disclosures of both of which are incorporated herein in their entirety by reference.

BACKGROUND

1. Field of the Invention

The present invention relates to an image display apparatus and a photographing apparatus that can change an orientation and an aspect ratio of a display image.

2. Description of the Related Art

Conventional photographing apparatuses, such as digital still cameras (DSCs) or digital video cameras (DVCs), display photographed images and their setting information as an on-screen display (OSD) on display units included therein. The content and position of the OSD to be displayed are preset or fixed.

A live view is a function for displaying the currently photographed image in real time. When the live view is displayed on a photographing apparatus, if an orientation or an aspect ratio of an image is changed, a display position of the image on the display unit of the apparatus is also changed.

When an image file is displayed on the photographing apparatus, if the orientation or the aspect ratio of the image is changed, the display position of the image on the display unit is also changed.

Since an image display region of a display unit included in a conventional photographing apparatus may vary according to the orientation or the aspect ratio of an image being displayed on the display unit, a user has to change display settings of each image for easy viewing which requires complicated manipulation.

SUMMARY

A photographing apparatus is provided whose display images can be viewed more easily regardless of an orientation or an aspect ratio of the display images.

According to an embodiment of the photographing apparatus, the apparatus is provided with an image display apparatus including: a display unit displaying an image; an image display setting unit setting a display format of the image; and a setting information position determination unit determining the position of setting information to be displayed on the display unit based on the display format set by the image display setting unit.

In this image display apparatus, when the display format of an image is set by the image display setting unit, the position of setting information to be displayed together with the image is determined based on the set display format. Therefore, it is possible to position the setting information on the display unit so that the display of the setting information does not affect, interfere with or overlap the image.

According to another embodiment of the photographing apparatus, the apparatus is provided with an image display apparatus including: a display unit displaying an image; a motion sensing unit sensing motion of a body of the image display apparatus; and an image display setting unit setting a display format of the image based on the motion sensed by the motion sensing unit.

In this image display apparatus, a user may change the display format of the image on the image display unit by moving or shaking the body or housing of the image display apparatus. The motion sensing unit may be a sensor sensing the motion or shaking of the body or housing of the image display apparatus. The sensor may be operative to sense motion in multi-axis directions.

The apparatus may further include a setting information position determination unit determining the position of setting information to be displayed on the display unit based on the display format set by the image display setting unit.

The display format may include at least one of an orientation or an aspect ratio of the image.

BRIEF DESCRIPTION OF THE DRAWINGS

FIG. 4 illustrates the relationship between the setting of an orientation and an aspect ratio and a background frame, according to an embodiment of the present invention;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
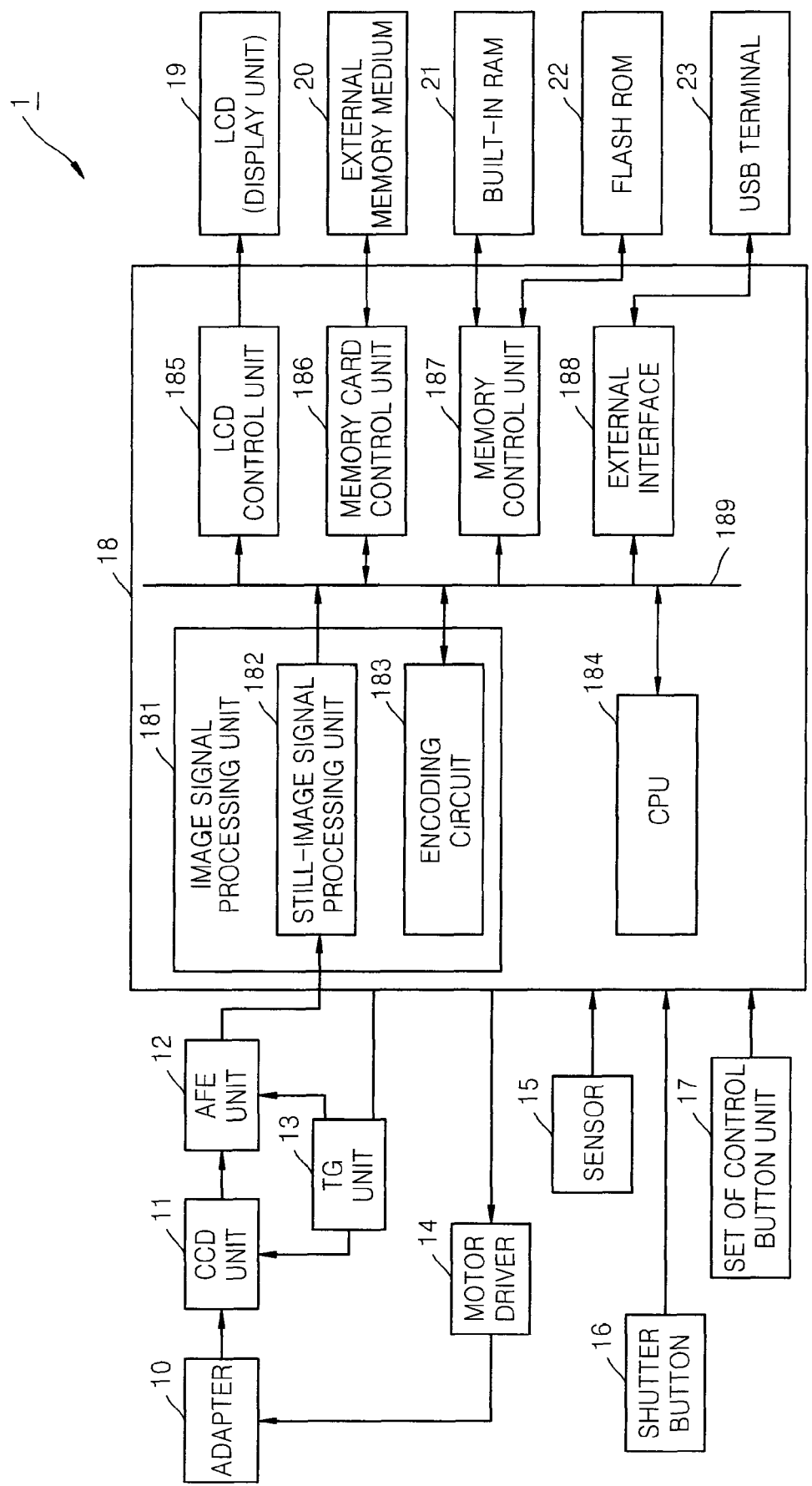
FIG. 1 is a block diagram of an example photographing apparatus according to an embodiment of the present invention.

FIG. 1 is a block diagram of a photographing apparatus 1 according to an embodiment of the present invention. Referring to FIG. 1, an adapter 10 of the photographing apparatus 1 includes a lens for forming an image subject on a charge coupled device (CCD) unit 11, a focus adjustment motor driving the lens, and a zoom motor.

The CCD unit 11 photo-electrically converts the image formed by the adapter 10 and outputs an analog image signal in response to a timing signal received from a timing generator (TG) unit 13. An analog front end (AFE) unit 12 converts the analog image signal received from the CCD unit 11 into digital image data in response to the timing signal received from the TG unit 13.

Under the control of a DBE unit 18, the TG unit 13 operates as a timing signal generator generating and outputting various timing signals to control the CCD unit 11 and the AFE unit 12.

A motor driver 14 drives the focus adjustment motor and the zoom motor included in the adapter 10.

A sensor 15 may be, for example, an acceleration sensor or a gyrosensor sensing the movements of the body or housing of the photographing apparatus 1 and which outputs the result to the DBE unit 18. A shutter button 16 may be pressed by a user to take a photograph of an image. A set of control button unit 17 is composed of a plurality of control buttons 171 through 177 (see FIG. 3) outputting corresponding signals to the DBE unit 18 when the control buttons 171 through 177 are pressed.

The DBE unit 18 controls a liquid crystal display (LCD) unit 19, a memory (external memory medium 20), and an external interface.

An image signal processing unit 181 included in the DBE unit 18 processes image signals.

A still-image signal processing unit 182 included in the image signal processing unit 181 processes the digital image data received from the AFE unit 12 and outputs the processed digital image data to a bus line 189. An encoding circuit 183 receives and encodes the processed digital image data from the bus line 189. A central processing unit (CPU) 184 communicates with each unit included in the DBE unit 18 by way of the bus line 189.

An LCD control unit 185 converts digital image data or an on-screen display (OSD) into a format, which can be displayed on the LCD unit 19, and outputs the same accordingly. A memory card control unit 186 controls reading from and writing to an external memory medium 20. A memory control unit 187 controls reading from and writing to a built-in random-access memory (RAM) 21 and a flash read-only memory (ROM) 22. An external interface 188 controls connection to an external device (not shown) through a universal serial bus (USB) terminal 23.

The LCD unit 19 displays an output of the LCD control unit 185. The external memory medium 20 stores image data, and the memory card control unit 186 controls reading or writing of image data from or to the external memory medium 20.

The built-in RAM 21 temporarily stores photographed digital image data and stores data processed by the CPU 184. The flash ROM 22 stores various constant data and a program or algorithm for execution by the CPU 184.

Figure 2:
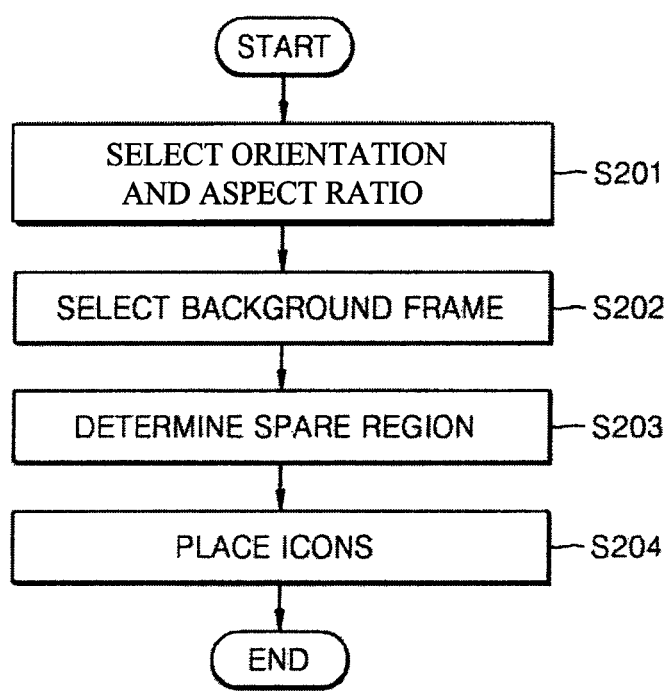
FIG. 2 is a flowchart illustrating an example method of determining display positions of icons on a liquid crystal display (LCD) unit of the photographing apparatus of FIG. 1.

Example operation of the photographing apparatus 1 will now be described with reference to FIGS. 2 through 6. FIG. 2 is a flowchart illustrating an example method of determining a display position of icons of the OSD on the LCD unit 19. In a live view or preview display (i.e., a viewfinder-type image display prior to photographing), an image signal output from the CCD unit 11 is displayed on the LCD unit 19 substantially in real time via the AFE unit 12, the still-image signal processing unit 182, and the LCD control unit 185.

Referring to FIG. 2, a user sets or selects an orientation and an aspect ratio (operation S201), and the CPU 184 selects a background frame based on the orientation and the aspect ratio set by the user (operation S202). In an embodiment, the orientation and the aspect ratio are set when the user shakes or moves the body or housing of the photographing apparatus 1. Operations S201 and S202 will now be described in more detail with reference to FIGS. 3 and 4.

Figure 3A:
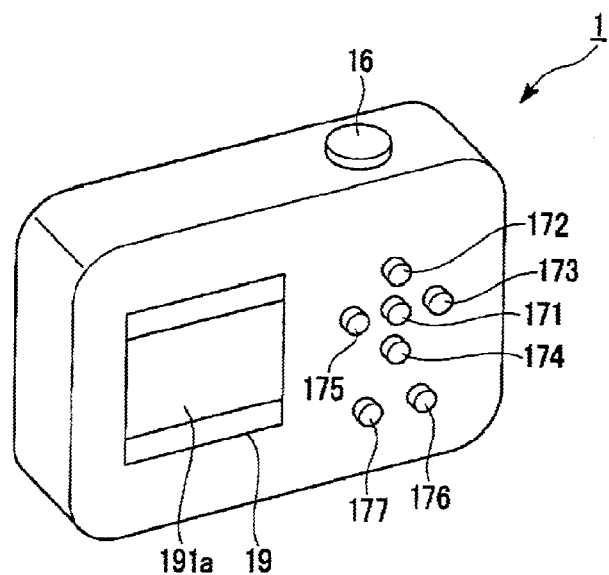
FIGS. 3A and 3B are perspective views illustrating the back of the photographing apparatus of FIG. 1.
Figure 3B:
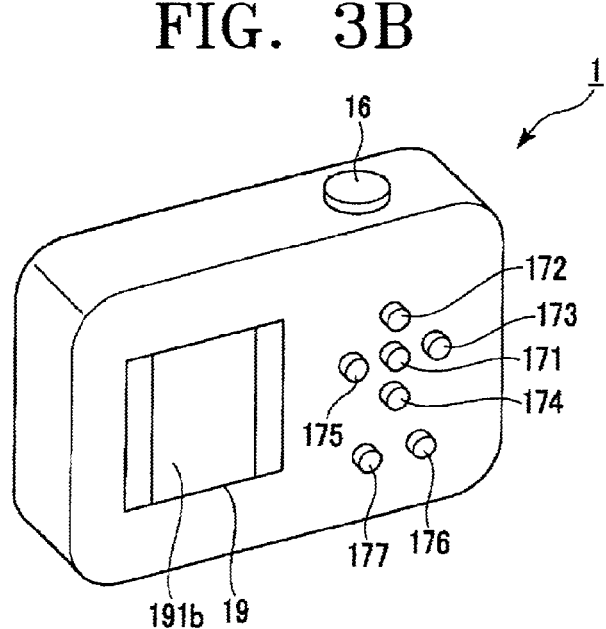

FIGS. 3A and 3B are perspective views illustrating the back of an example photographing apparatus 1. The control buttons 171 through 177 of the set of control button unit 17 are illustrated in FIGS. 3A and 3B. The user can select, determine, and cancel various functions of the photographing apparatus 1 by actuating the control buttons 171 through 177.

FIG. 3A illustrates a state in which the orientation of a subject being photographed or an image being displayed is horizontal and the aspect ratio is 4:3. In FIG. 3A, a horizontal live view display region on the LCD unit 19 is indicated by reference numeral 191*a*. FIG. 3B illustrates a state in which the orientation of a subject being photographed or an image being displayed is vertical and the aspect ratio is 4:3. In FIG. 3B, a vertical live view display region on the LCD unit 19 is indicated by reference numeral 191*b*.

FIG. 4 illustrates the relationship between the setting of the orientation and the aspect ratio, and the background frame. As illustrated in FIG. 3A, a background frame of FIG. 4 indicated with "(1)" is selected. In the state of FIG. 3B, a background frame of FIG. 4 indicated with "(5)" is selected.

The image is recorded on the external memory medium 20 with the orientation and the aspect ratio selected by a user in operation S201. Therefore, the image recorded on the photographing apparatus 1 can be displayed on another photographing apparatus or a personal computer (PC) as intended (i.e., substantially similarly as the image would be displayed on LCD 19) and without having to rotate, flip or otherwise change the initially-displayed image.

Specifically, if the conventional method of adjusting the orientation to a vertical direction by rotating the photographing apparatus is applied when the photographed image is displayed on another photographing apparatus or a PC, the photographed image is rotated 90 degrees and is thus displayed in a horizontal direction. Therefore, the photographed image is not displayed as a user intended. However, if the orientation is set to the vertical direction according to the present embodiment, the photographed image is recorded in this orientation, that is, the vertical direction. Therefore, when the image is displayed on another photographing apparatus or PC, the image can be displayed in the vertical direction as intended.

In FIG. 4, when the user shakes or moves the body or housing of the photographing apparatus 1 once while the background frame (1) is selected, the movement of the body of the photographing apparatus 1 is sensed by the sensor 15 and a motion signal is output to the DBE unit 18. When the motion signal output of the sensor 15 is input to the CPU 184, the orientation is changed to the horizontal direction and the aspect ratio of the live view display is changed to 16:9 in the live view display setting. Accordingly, a background frame indicated with "(2)" in FIG. 4 is selected.

In addition, when the user shakes or moves the body or housing of the photographing apparatus 1 again when the image is being displayed with background frame (2), the live view display becomes a square, and the background frame indicated with "(3)" in FIG. 4 is selected. In this way, whenever the user shakes the body of the photographing apparatus 1, the setting of the orientation and the aspect ratio is changed accordingly in the present embodiment.

Accordingly, a background frame is selected by the CPU 184 in the order of the background frames (1) through (5) illustrated in FIG. 4. However, in other embodiments, the background frames may be selected other orders, for example (5) to (1), etc.

When the orientation and the aspect ratio are set and the background frame is selected, the still-image signal processing unit 182 selects digital image data corresponding to the live view display region of the selected background frame from the digital image data output from the AFE unit 12 and outputs the selected digital image data. In the present embodiment, the orientation and the aspect ratio are changed according to the digital image data selected by the still-image signal processing unit 182. Therefore, the user can photograph images in various orientations and aspect ratios without having to rotate the photographing apparatus 1 and also view the photographed and stored images without having to rotate the photographing apparatus 1.

Digital image data outside the live view display region in addition to digital image data within the live view display region may be temporarily stored in the built-in RAM 21. Therefore, in a play view display after a photographing operation, a display region of a photographed image can be adjusted using the digital image data outside the live view display region. Accordingly, the user can adjust the display region of the photographed image without taking a photograph of the image again.

The method of changing the orientation and the aspect ratio settings by sensing the movements of the body of the photographing apparatus 1 according to the present embodiment has been described above. However, a method of changing the settings of the orientation and the aspect ratio by sensing the movements of the body of the photographing apparatus 1 using a sensor sensing in multi-axis directions and comparing the result of the sensor with a predetermined pattern may be used. For example, when the user shakes the body of the photographing apparatus 1 in an upward/downward direction while in the state of FIG. 3A, the orientation changes to the vertical direction, and the state of FIG. 3A changes to the state of FIG. 3B.

In addition, the setting of the orientation and the aspect ratio changes according to the sensing of a physical quantity, such as inclination, direction, speed, and acceleration of the body, or a combination of two or more of these physical quantities. In this way, the user can intuitively change the orientation or the aspect ratio by shaking or moving the photographing apparatus 1 instead of manipulating the control buttons 171 through 177.

In FIG. 2, when a background frame is selected, the CPU 184 determines a spare region (see, for example FIG. 5A) where an image of a live view is not displayed or which does not affect the image of the live view even through the OSD is displayed (operation S203).

Specifically, when the background frames (1) and (2) of FIG. 4 are selected, top and bottom regions of the background frames (1) and (2) are determined to be the spare region, whereas when the background frames (4) and (5) are selected, right and left regions of the background frames (4) and (5) are determined to be the spare region. In the case of the background frame (3) of FIG. 4, the differences between the entirely displayed pixel data and the background pixel data are calculated, and the region with the smallest difference between the displayed pixel data and the background pixel data is determined to be the spare region. When the spare region is determined, icons are disposed, placed, arranged or otherwise configured in the determined spare region as the OSD (operation S204).

Figure 5A:
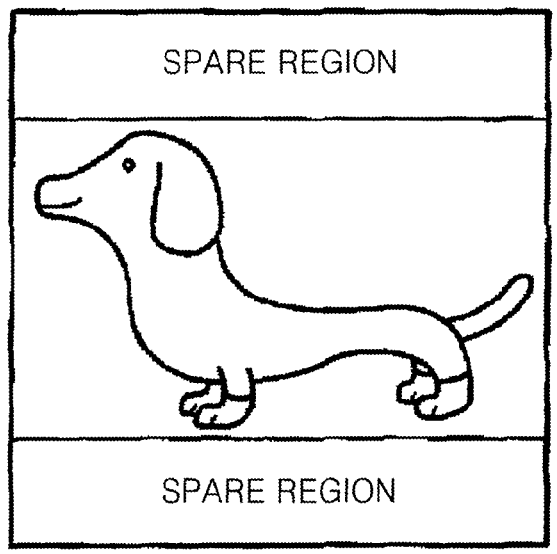
FIGS. 5A and 5B illustrates the disposition of icons on the LCD unit of the photographing apparatus of FIG. 1 when the displayed image orientation is horizontal.
Figure 5B:
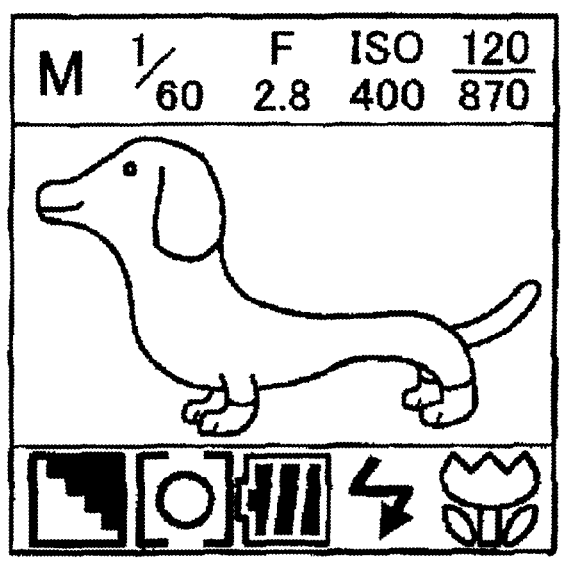
Figure 6A:
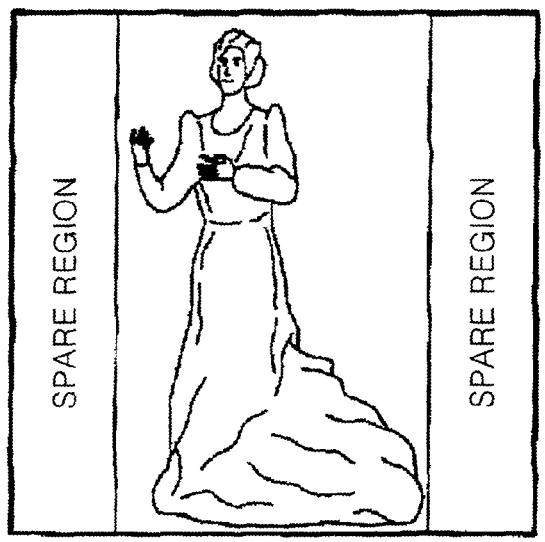
FIGS. 6A and 6B illustrate the disposition of the icons on the LCD unit of the photographing apparatus of FIG. 1 when the displayed image orientation is vertical.
Figure 6B:
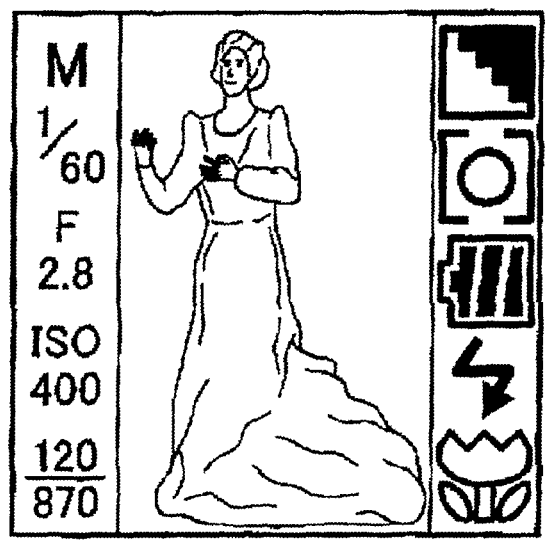

FIGS. 5A, 5B, 6A and 6B illustrate the disposition of icons on the LCD unit 19 of the photographing apparatus 1 of FIG. 1. Specifically, FIGS. 5A and 5B illustrate a state in which the orientation is horizontal and the aspect ratio is 16:9, that is, the background frame (2) of FIG. 4. Similarly, FIGS. 6A and 6B illustrate a state in which the orientation is vertical and the aspect ratio is 16:9, that is, the background frame (4) of FIG. 4.

Referring to FIGS. 5A and 5B, since top and bottom regions are determined to be the spare region as illustrated in FIG. 5A, the icons are disposed in the top and bottom regions as illustrated in FIG. 5B. Referring to FIGS. 6A and 6B, since right and left regions are determined to be the spare region as illustrated in FIG. 6A, the icons are disposed in the right and left regions as illustrated in FIG. 6B. In addition, the types of icons to be displayed, a quantity thereof, their arrangement and/or sizes may vary according to the size of the spare region.

Sequential operations included in the method of determining the display positions of various OSD icons on the LCD unit 19 in the live view display have been described above. Whenever the setting of the orientation or the aspect ratio is changed, the sequential operations are performed. Therefore, the OSD is always disposed in the spare region of a photographed image, thereby enhancing visibility.

When a still image photographed by the CCD unit 11 or an image stored in the external memory medium 20 is displayed, the orientation and the aspect ratio can be recognized by determining the spare region according to the sequential procedures described above with reference to operation S203. The same applies to a case where a moving image recorded on the external memory medium 20 is replayed.

By disposing the OSD according to procedures described above with reference to operation S204, the OSD can be displayed in the spare region of an image. Therefore, visibility can be enhanced as in the live view display since the OSD does not overlap or otherwise interfere with the image being displayed.

While the present embodiment has been described in detail, it will be understood by those of ordinary skill in the art that various changes in form and details may be made therein without departing from the spirit and scope of the present invention. For example, the position of an OSD in a background frame of FIG. 4 may be preset, and the position of the OSD may be determined substantially simultaneously with selection of the background frame in operation S202. In the present embodiment, digital image data output from the still-image signal processing unit 182 is changed according to the orientation or aspect ratio of an image in the live view display. However, digital image data required for the live view display may be acquired from the CCD unit 11.

In an image display apparatus for a photographing apparatus 1 or other electronic device that is known in the art, a display unit may be, for example, the LCD unit 19 of FIG. 1, and a display format is, for example, the orientation and aspect ratio of an image. In addition, an image display setting unit may be, for example, the CPU 184 of FIG. 1 which performs operation S201 of FIG. 2 or operation S204 in which an image display format is identified based on the differences between the entirely displayed pixel data and the background pixel data and a display region is determined based on the image display format. Setting information may be, for example, an OSD displayed as icons. Also, the setting information position determination unit may be, for example, the CPU 184 that performs operations S203 and S204. A motion sensing unit may be, for example, the sensor 15.

A photographing device of a photographing apparatus that includes the foregoing-described image display apparatus may be, for example, the CCD unit 11 of FIG. 1. A memory unit for use with the photographing device may be, for example, the built-in RAM 21.

The present image display apparatus is suitable for photographing apparatuses such as digital still cameras (DSCs) or digital video cameras (DVCs) as well as other devices known in the art.

As described above, a display format of an image on a display unit of an image display apparatus according to the present invention can be changed when a user shakes or moves a body or housing of the photographing apparatus. Therefore, the user can easily select a desired display format through intuitive control. In addition, when the display format of an image is set by an image setting unit, the position of setting information to be displayed together with the image is determined based on the set display format. Therefore, it is possible to position the setting information on the display so that the display of the setting information does not affect the image. Therefore, the invisibility due to the superimposition of the setting information on the image can be prevented regardless of the display format of the image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus for a photographing apparatus, the image display apparatus comprising:
 a display unit that displays at least one of an image and a background frame;
 a motion sensing unit that senses motion of a body of the photographing apparatus while at least one of the image and the background frame is displayed on the display unit and while an orientation of the body of the photographing apparatus is retained; and
 an image display setting unit that sets a display format of the image and the background frame according to the motion sensed by the motion sensing unit,
 wherein the image display setting unit changes an aspect ratio of the image sequentially among a plurality of predetermined aspect ratio types whenever the motion is sensed, and the image display setting unit changes the format of the background frame according to the change of the aspect ratio of the image.

2. The apparatus of claim 1, wherein the motion sensing unit is selected from the group consisting of accelerometers and gyroscopes.

3. The apparatus of claim 1, wherein the motion sensing unit includes at least one sensor configured to detect motion of the photographing apparatus along at least one axis.

4. A photographing apparatus comprising:
 a photographing module that photographs an image of a subject;
 a display unit that displays the image, a background frame, and on screen display (OSD) information relative to the image within the background frame;
 a motion sensing unit that senses motion of a body of the photographing apparatus while at least one of the image and the background frame is displayed on the display unit and while an orientation of the body of the photographing apparatus is retained;
 an image display setting unit that formats image data of the image for reproduction on a first portion of the display unit according to the motion sensed by the motion sensing unit; and
 an OSD information position determination unit that reproduces the OSD information within the background frame on a second portion of the display unit according to a format of the image data set by the image display setting unit,
 wherein the image display setting unit changes an aspect ratio of the image sequentially among a plurality of predetermined aspect ratio types whenever the motion is sensed, and the image display setting unit changes a format of the background frame according to the change of the aspect ratio of the image.

5. The apparatus of claim 4, wherein at least one of characteristic and content of the OSD information reproduced varies according to at least one of a size and position of the background frame on the second portion of the display unit.

6. The apparatus of claim 4, wherein the motion sensing unit includes at least one sensor selected from the group consisting of accelerometers and gyroscopes.

7. The apparatus of claim 6, wherein the at least one sensor is configured to detect motion of the photographing apparatus along at least one axis.

8. A digital camera comprising:
 a device that captures an image of a subject;
 a display unit that displays at least one of the image, a background frame, and a plurality of informational icons relative to the image within the background frame;
 a motion sensing unit that senses motion of a body of the digital camera while at least one of the image and the background frame is displayed on the display unit and while an orientation of the body of the digital camera is retained;
 a processing unit that adjusts image data of the image for reproduction on a first portion of the display unit according to the motion sensed by the motion sensing unit; and
 an information position determination unit that reproduces the plurality of informational icons within the background frame on a second portion of the display unit according to a format of the image data set by the processing unit,
 wherein the processing unit changes an aspect ratio of the image sequentially among a plurality of predetermined aspect ratio types whenever the motion is sensed, and the processing unit changes a format of the background frame according to the change of the aspect ratio of the image.

9. The digital camera of claim 8, wherein the plurality of predetermined aspect ratio types comprises 4:3, 16:9, and 1:1.

10. The digital camera of claim 9, wherein the second portion of the display unit comprises two non-adjacent, non-contiguous spare regions configured between the first portion and a perimeter of the display unit.

11. The digital camera of claim 10, wherein the perimeter of the display unit is generally square-shaped.

12. The digital camera of claim 11, wherein both of the two non-adjacent, non-contiguous spare regions are oriented substantially parallel and at least one of horizontally and vertically.

13. The digital camera of claim 8, wherein the motion sensing unit detects at least one of an inclination, direction, speed, and acceleration of the body of the digital camera.

14. The digital camera of claim 8, wherein the motion sensing unit communicates with at least one of the processing unit and the information position determination unit.

15. The digital camera of claim 8, wherein the motion sensing unit includes at least one sensor selected from the group consisting of accelerometers and gyroscopes.

16. The digital camera of claim 15, wherein the at least one sensor is configured to detect motion of the body of the digital camera along at least one axis.

17. The digital camera of claim 16, wherein a first axis of the at least one axis is a horizontal axis and a second axis of the at least one axis is a vertical axis.

* * * * *